United States Patent [19]

Kudelski et al.

[11] Patent Number: 4,521,706
[45] Date of Patent: Jun. 4, 1985

[54] TAPE DRIVING CAPSTAN POWERED WITH A PERMANENT MAGNET MOTOR

[75] Inventors: Stefan Kudelski, Chemin de la Croix; Ernest Rosselet, Assens, both of Switzerland

[73] Assignee: Ampex Corp., Redwood City, Calif.

[21] Appl. No.: 533,095

[22] Filed: Sep. 15, 1983

[30] Foreign Application Priority Data

Sep. 17, 1982 [GB] United Kingdom ............... 8226572

[51] Int. Cl.³ ............................................. H02K 7/00
[52] U.S. Cl. ................................ 310/67 R; 310/68 B; 310/157; 310/171; 310/266; 310/209; 310/191; 235/103
[58] Field of Search ................ 310/67 R, 68 B, 156, 310/157, 171, 177, 191, 209, 266; 235/103, 92 A; 226/188

[56] References Cited

U.S. PATENT DOCUMENTS

| | | | |
|---|---|---|---|
| 3,247,400 | 4/1966 | Wolfner | 310/191 X |
| 3,329,845 | 7/1967 | Lear | 310/67 R |
| 3,389,295 | 1/1975 | Guzman et al. | 310/171 X |
| 3,564,306 | 2/1971 | Ott et al. | 310/67 R |
| 3,978,355 | 8/1976 | Hofert et al. | 310/191 X |
| 4,260,915 | 4/1981 | Kawasumi | 310/191 X |

FOREIGN PATENT DOCUMENTS

| | | | |
|---|---|---|---|
| 2415899 | 9/1979 | France | 310/67 R |
| 2027285 | 2/1980 | United Kingdom | 310/67 R |

*Primary Examiner*—Mark O. Budd
*Attorney, Agent, or Firm*—Harry G. Thibault; Joel D. Talcott

[57] ABSTRACT

A tape driving capstan comprises a hollow post (39) a capstan member (36) and a rotor (57,58) which extends radially of the capstan member within a housing (49). The rotor carries permanent magnets (59) and a stator winding (66) is disposed within the confines of the rotor.

8 Claims, 3 Drawing Figures

4,521,706

TAPE DRIVING CAPSTAN POWERED WITH A PERMANENT MAGNET MOTOR

BACKGROUND OF THE INVENTION

This invention relates to capstans for use in tape transports and in particular to a capstan suitable for use in a tape transport forming part of a video tape recorder.

Capstans for sophisticated tape transports, particularly those incorporated as part of video tape recorders, are required to have high performance, so that they can drive a tape at accurate and controllable speeds. Various designs of capstan are suitable for this general purpose. However, there is a need for a new design, particularly for use in a battery portable video tape recorder in which small size and simplicity of construction have to be fulfilled as well as the requirements of high performance.

It is accordingly a general object of the invention to provide an improved tape driving capstan.

It is a preferred object of the invention to provide a tape drive capstan of simple and compact construction, including its own motor yet providing shielding for the magnetic fields of the motor.

A further aspect of the invention lies in the use of a brushless DC motor for driving the capstan. Such a motor is capable of reliable, quiet performance at high efficiency and it is accordingly a further object of the invention to provide a capstan which includes the relatively rotatable elements of a brushless DC motor.

A further aspect of the invention lies in the incorporation in the capstan of a tachometer assembly. In order to provide servo-mechanical control of a tape capstan, it is necessary to monitor the speed of rotation of the capstan by means of a tachometer in order by comparison of a signal derived from the tachometer and a reference signal to derive an error signal which may be used to energise a power amplifier which drives the capstan, the servo-mechanism being arranged to regulate the speed of the capstan within close limits. A further aspect of the invention is therefore to provide a capstan which includes its own tachometer in a convenient manner.

SUMMARY OF THE INVENTION

In a preferred form of the invention a capstan for use in a tape transport comprises a rotatable assembly disposed upright with respect to a base, the rotatable assembly including a cylindrical tape-engaging portion and a rotor portion, the said rotor portion being between the cylindrical tape-engaging portion and the base and being of dish-shaped form facing the base, a plurality of magnets being carried at angularly spaced intervals around the inside of the rotor; and a stator winding extending around the base in proximity to said magnets and within said rotor. Such an arrangement provides a compact form of capstan particularly suitable for portable tape transports. The magnets and stator winding constitute the relatively rotating parts of a commutatorless motor. Preferably the magnets are carried near the rim of the rotor and the stator winding is disposed radially inward of the magnets.

One advantage of the present invention is that the rotor can conveniently constitute a magnetic shield so that neither the tape nor other magnetic devices are affected by the close proximity of the stator winding. In particular the invention facilitates the inclusion of a magnetic tachometer which is preferably disposed above said rotor with respect to the base. The tachometer may comprise a first magnetically permeable toothed ring carried on said rotatable assembly and coaxial therewith, a second magnetically permeable toothed ring fixedly mounted relative to the base and in axial register with said first ring, said rings partly defining a magnetic circuit extending axially in the region of the teeth, radially of said rings and axially of said rings in a region radially spaced from said teeth, a ring magnet coaxial with said rings for producing flux in said flux path and a sensing coil coaxial with said rings and disposed to link with the flux path.

The capstan may further comprise a housing secured to said base and extending around and over said rotor, a hollow post extending from the housing, the hollow post being positioned to receive the cylindrical tape-engaging portion and having a lateral aperture for providing tape-engaging access to the said cylindrical tape-engaging portion and providing a bearing for said rotatable assembly. The post may include a thrust bearing for one end of said rotatable assembly and the said magnets may be axially displaced with respect to the stator winding so as to urge the capstan assembly towards said bearing. This arrangement provides a simple means of maintaining the axial position of the tape-engaging portion of the capstan.

BRIEF DESCRIPTION OF THE ACCOMPANYING DRAWINGS

DETAILED DESCRIPTION OF THE PREFERRED EMBODIMENT

Figure 1:
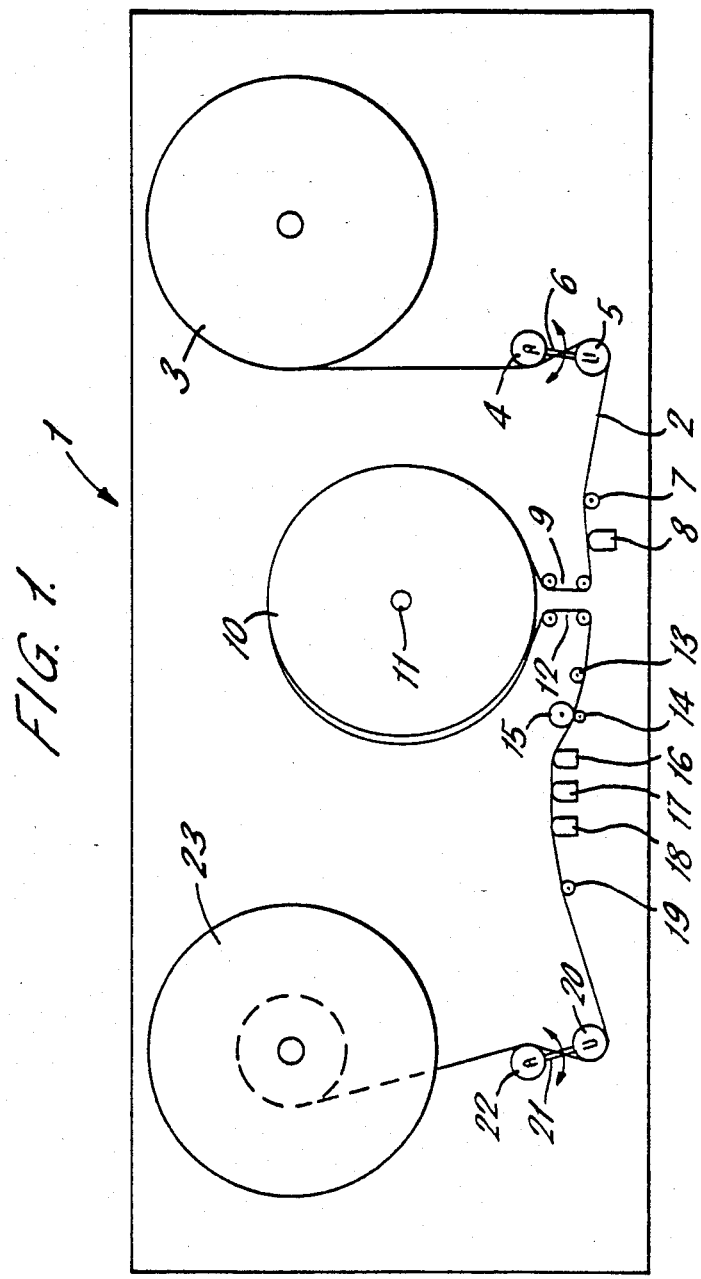
FIG. 1 is an explanatory schematic diagram of the principal parts of a video tape recorder.

FIG. 1 illustrates in simplified form the principal parts of a video tape recorder, this recorder being an example of a system in which the capstan, its motor and the servo-mechanism described later may conveniently be used. As is shown in FIG. 1, the recorder 1 is intended for recording signals on or playing back signals from a magnetic tape 2 which is supplied by a supply reel 3 driven by a motor not shown. From the supply reel the path of the tape 2 extends around a rotatable guide post 4 and thence to a rotatable guide 5 which is carried at one end of an arm 6 mounted coaxially with the guide 4. The purpose of the pivoted arm is to provide sensing of the tension of tape in a loop around the guide 5, it being apparent that if the tension in the tape of this loop increases, the arm 6 will rotate. The rotation of the arm can be sensed by any convenient known means and used in known manner to control the motor which drives the reel 3 in order to maintain a substantially constant length of tape in the loop.

From the guide 5 the path of the tape extends past a guide 7 and a video erase head 8 to a pair of guides 9 controlling the entrance of the tape to a helical path extending around a drum 10 of which the axis 11 is slightly tilted relative to the general plane of the path of the tape. Within the drum is a motor driving around the periphery of the drum a scanning head for the scanning of the tape in oblique tracks, in a manner generally known per se. At the end of the helical path of the tape around the drum 10 the tape passes around a pair of guides 12 and extends past a guide 13 to a capstan 14 which is provided with a pinch roller 15 for the maintenance of the tape in close proximity to the capstan. The tape path extends from the capstan past erase, audio and control track heads 16 to 18, a further guide post 19, a guide 20 mounted at one end of a pivoted arm 21, a guide post 22 disposed coaxially with the pivot for the arm 21 and finally to a take-up reel 23. The guide 20 acts in a manner similar to the guide 5, the pivoting movement of the arm 21 providing a measure of the tension in the loop of tape around the guide 20 and providing a control for the motor (not shown) which drives the take-up reel 23.

The longitudinal speed of traverse of the tape is controlled by the capstan 14, which must provide high performance, and be driven with a considerable degree of stability.

Figure 2:
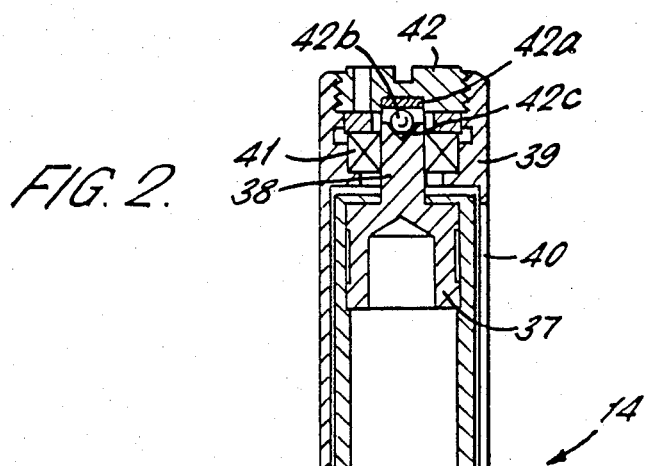
FIG. 2 is a sectional view of an improved capstan and tachometer assembly for use in the recorder depicted in FIG. 1.

FIG. 2 illustrates a preferred construction for the capstan 14.

The capstan 14 has a base plate 30 which has a central aperture 31 and surrounding the aperture an upwardly extending annular flange 32 which accommodates a bearing 33. The bearing supports for rotation a spigot 34 constituting a lower extension of a cylindrical bush 35 fitted within a cylindrical capstan member 36 which extends upwardly. At the top end of the capstan member 36 is an upper bushing 37 from the top end of which extends a spigot 38. Surrounding (with a small clearance) the member 36 for most of the length thereof and extending above the top of the member 36 is a generally cylindrical shell 39 which has an aperture 40 extending axially of the capstan member 36 and also extending around a substantial part of the periphery of the member 36 so as to enable the outer surface of the capstan member to engage the tape 2. At the upper end of the shell 39 is supported an upper bearing 41 in which the spigot 38 is received for rotation. The top end of the shell is closed by a screw-threaded plug 42, which carries a sapphire seat 42a engaged by a ball 42b disposed in a conical seat 42c in the top of the spigot 38.

At the end of the lower spigot 34 of previous mention is accommodated a ball 43 which protrudes below the spigot 34 and is engaged by a leaf spring 44 secured, for example, by adhesive to a plate 45 likewise secured to the underside of the plate 30. The spring 44 in conjunction with the ball 43 provides an electrical earth for the capstan member 36.

Below the base plate 30 extend radial ribs 46 and 47 which reinforce the plate 30.

At its lower end, the shell 39 is provided with a radial flange 48 by means of which it is mounted at the inner margin of the housing 49 for the motor which drives the capstan. The housing 49 consists principally of an annular plate 50 forming the top cover for the housing and a cylindrical side wall 51 extending downwardly from the periphery of the plate 50 to engage the periphery of the base plate 30. Extending vertically down the side wall 51 is a plurality of ribs 52, of which only one is shown. The ribs 52 are secured to outwardly extending lugs 53 from the base plate 30 by respective screws 54 (of which only one is shown). The housing 49 defines a generally annular space within which the motor is accommodated.

The cylindrical capstan member 36 has near its bottom end a radially extending flange 55 to which is secured, by means of screws such as the screw 56, the inner periphery of an inverted dish-shaped rotor comprising an annular portion 57 which is generally parallel to the cover plate 50 and a depending cylindrical wall 58 parallel to and just inside the cylindrical wall 51 which forms part of the housing 49. The rotor may be made of iron in order to provide a magnetic shield surrounding the motor, of which the stator is wholly accommodated within the space defined by the cylindrical wall 58.

The motor employed in the preferred embodiment of the capstan is a brushless DC motor. In such a motor, the magnetic circuit rotates whereas the windings which are normally disposed on the rotor of a DC motor are fixed in position. In the motor shown in FIG. 2, the rotor carries a plurality of permanent magnets 59, which are disposed at equally spaced intervals around the inner side of the wall 58 forming part of the rotor.

Below the location of the flange 55 are outwardly extending arms (of which only one is shown in the drawing), each such arm 60 having a magnetically permeable depending lug 61 of which the path of rotation extends through a gap in a part circular magnetically permeable core 62 which carries a coil 63 and is supported in a block 64 secured to the base plate 30 by means of a bolt 64a. The purpose of the coil 63 is to sense the entry of the lug 61 into the core 62 and thereby provide an indication of a particular angular position of the rotor for the capstan. As is well-known, a brushless DC motor must be provided with a switching circuit which acts in the manner of a commutator to switch the directions of current in the various parts of the stator winding. Although the particular construction and operation of the commutator circuit is not critical to the present invention, any of the known switching arrangements being suitable, the sensing coil 63 in conjunction with the extension of the rotor formed by the arm 60 and the lug 61 provides a convenient and reliable means of timing the switching performed by the commutation circuit. In general, the number of coils 63 will depend upon the number of phases of the stator winding and the number of lugs 61 will depend on the number of magnets provided on the rotor.

The stator winding, which in a brushless DC machine corresponds to the armature winding of an ordinary DC machine with commutator segments, is carried by a slotted annular member 65 disposed concentrically with the axis of the capstan and disposed on the base plate 30. The stator winding is illustrated diagrammatically at 66 and is wound around a former 67. The winding 66 extends in a circle concentric with the axis of the motor closely adjacent the annular path in which the magnets 59 travel. The magnets 59 are axially displaced from symmetry with respect to the winding 66 so that the rotor is urged upwardly, the upward pressure being sustained by the sapphire seat. Thus the capstan needs only one thrust bearing, which is constituted by the readily accessible ball 42b and seat 42a.

The capstan includes its own tachometer. This tachometer relies on a coil to sense the variation in magnetic flux caused by the variable reluctance of a magnetic circuit which extends between two similarly toothed annuli arranged in substantial axial register. One of the toothed rings is shown at 68, being carried on the upper surface of the plate 57 forming part of the rotor. Thus the ring 68 is disposed in a plane normal to the axis of the capstan and its rotor and is arranged concentrically of the capstan. The ring 68 has a toothed periphery 69, being formed in the manner of a gear wheel. The other ring, which is of similar radial dimension, is shown at 70. This ring has a toothed periphery similar in radial section to that of the ring 68. However, the ring 70 is made of greater axial depth at its outer periphery, so that the teeth 71 are of greater axial depth than the teeth 69. Inwardly of the periphery of the ring 70 is disposed a coil 74 which may have a plurality of turns and is disposed concentrically with the rings and thereby coaxially of the capstan and its rotor. The ends of this coil may be taken externally of the capstan housing by means of slots in the ring 70 and a cooperative slot in the cover plate 50.

Radially inwardly of the coil and disposed closely adjacent the lower side margin 72 of the ring 70 is a ring magnet 73, likewise arranged coaxially of the capstan assembly. This ring magnet is polarised in the axial direction so as preferably to produce a peripherally uniform flux.

Figure 3:
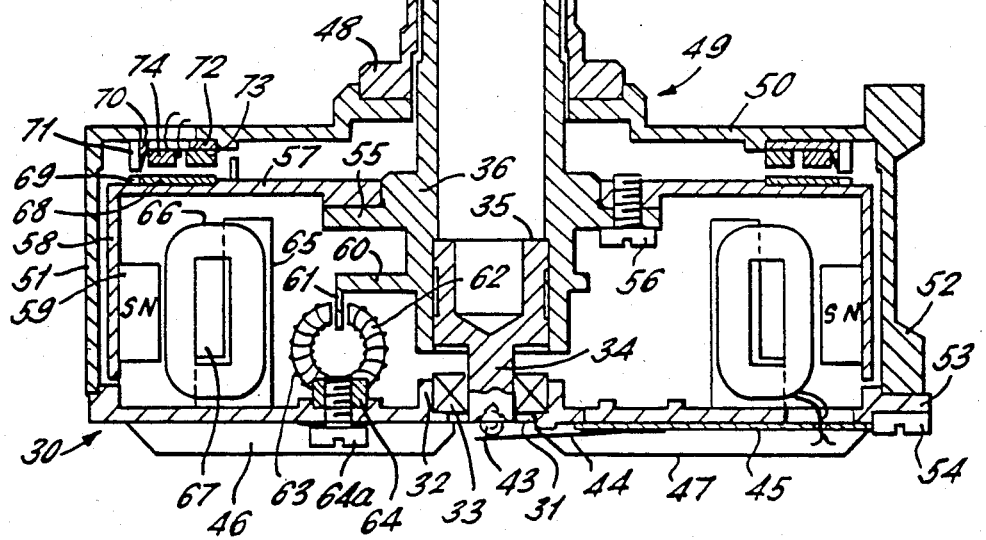
FIG. 3 is a drawing illustrating a detail of the assembly shown in FIG. 2.
Figure 3:

There is a single flux path which extends radially of the ring 70, axially across the axial gap between the teeth 71 and 69, radially of the ring 68 and axially across the annular gap formed between the ring magnet 73 and the ring 68. This flux path is compact and is easily shielded from the strong magnetic fields of the motor by means of the rotor constituted by the annular portion 57 and the wall 58. As is shown in FIG. 3, which illustrates in plan view part of the ring 68 and its teeth 69 and also, in ghost, the teeth 71 of the ring 70, as the rotor of the capstan motor moves, the teeth 69 and 71 go into and out of axial register, thus varying the reluctance of the air gap between them and therefore the flux density. The variation in flux density is approximately sinusoidal and is averaged around the common periphery of the rings 68 and 70. Thus the construction can provide quite an accurate sinusoidal representation of the movement between the rotor and the stationary parts of the motor and minor tolerances in machining are to a large extent smoothed out, it being readily feasible to process the signal obtained from the coil 74, which links with the flux path, to achieve a substantially pure sinusoid.

The inner gap which is between the relatively rotatable parts and is actually defined between the ring magnet 73 and the ring 68 is preferably uniform.

The capstan and motor described with reference to FIGS. 2 and 3 are of quite simple construction and can readily (and preferably) be made of low inertia.

We claim:

1. A capstan for use in a tape transport, comprising:
a base;
a rotatable assembly disposed upright with respect to the base, the rotatable assembly including a cylindrical tape engaging portion and a rotor portion, the said rotor portion being between the cylindrical tape-engaging portion and the base and being of dish-shaped form facing the base; a plurality of magnets being carried at angularly spaced intervals around the inside of the rotor;
a stator winding extending around the base in proximity to said magnets and within said rotor;
a magnetic tachometer mounted above said rotor with respect to the base, the tachometer comprising;
a first magnetically permeable toothed ring carried on said rotatable assembly and coaxial therewith;
a second magnetically permeable toothed ring fixedly mounted relative to the base and in axial register with said first ring, said rings partly defining a magnetic circuit with a flux path extending axially in the region of the teeth, radially of said rings and axially of said rings in a region radially spaced from said teeth, a ring magnet coaxial with said rings for producing flux in said flux path and a sensing coil coaxial with said rings and disposed to link with the flux path.

2. A capstan according to claim 1 in which the magnets are carried near the rim of the rotor and the stator winding is disposed radially inward of the magnets.

3. A capstan according to claim 1 or claim 2 in which the rotor constitutes a magnetic shield.

4. A capstan according to claim 1, further comprising a housing secured to said base and extending around and over said rotor, a hollow post extending from the housing, the hollow post being positioned to receive the cylindrical tape-engaging portion and having a lateral aperture for providing tape-engaging access to the said cylindrical tape-engaging portion.

5. A capstan according to claim 4 in which said post includes a thrust bearing for one end of said rotatable assembly.

6. A capstan according to claim 5 in which the said magnets are axially displaced with respect to the stator winding so as to urge the capstan assembly towards said bearing.

7. A capstan for use in a tape transport, comprising:
a housing;
a hollow post extending from said housing; a capstan member including a cylindrical tape-engaging portion disposed within said post;
means defining a lateral aperature in said post for providing access to said tape engaging portion;
a rotor member carried by the capstan member, said rotor member extending laterally of the capstan member within the housing and constituting a magnetic shield;
a magnetic tachometer mounted above said rotor with respect to the base;
a plurality of permanent magnets carried at angularly spaced intervals around the rotor member;
a stator winding extending around said base and within the housing in proximity to and disposed radially inward of said magnets; and
a thrust bearing in one end of said post for resisting axial movement of said capstan member in one direction, said magnets being axially disposed relative to the stator winding so as to urge the capstan toward said bearing.

8. A tape capstan comprising:
a cylindrical capstan member having a tape engaging surface;
means for supporting said capstan member for rotation and defining a rotary axis therefore;
a rotor mounted for rotation with the capstan member, the rotor including a part extending radially of the capstan member;
a stator winding disposed adjacent said rotor for driving cooperation therewith;
a first permeable ring carried by the rotor and mounted coaxially therewith;
a second permeable ring fixedly mounted relative to said supporting means, said two rings each bearing a peripheral ring of teeth of similar number and in approximate axial register;
means for producing magnetic flux radially in said rings and axially between the peripheries thereof; and
a sensing coil mounted adjacent the second ring for sensing variations in said flux, said sensing coil being disposed coaxially of the capstan member, said rotor providing magnetic shielding of said rings and coil from said stator winding.

* * * * *